(12) United States Patent
Stiles, Jr. et al.

(10) Patent No.: US 8,480,373 B2
(45) Date of Patent: Jul. 9, 2013

(54) FILTER LOADING

(75) Inventors: Robert W. Stiles, Jr., Cary, NC (US);
Lars Hoffmann Berthelsen, Kolding (DK); Ronald B. Robol, Sanford, NC (US); Gert Kjaer, Soenderborg (DK); Einar Kjartan Runarsson, Soenderborg (DK)

(73) Assignees: Pentair Water Pool and Spa, Inc., Sanford, NC (US); Danfoss Low Power Drives, Graasten (DK)

( * ) Notice: Subject to any disclaimer, the term of this patent is extended or adjusted under 35 U.S.C. 154(b) by 1016 days.

(21) Appl. No.: 11/567,916

(22) Filed: Dec. 7, 2006

(65) Prior Publication Data
US 2007/0163929 A1  Jul. 19, 2007

Related U.S. Application Data

(63) Continuation-in-part of application No. 10/926,513, filed on Aug. 26, 2004, now Pat. No. 7,874,808, which is a continuation-in-part of application No. 11/286,888, filed on Nov. 23, 2005, now Pat. No. 8,019,479.

(51) Int. Cl.
*F04B 49/00* (2006.01)
(52) U.S. Cl.
USPC .......................... 417/43; 417/44.2; 417/44.11
(58) Field of Classification Search
USPC .................. 417/43, 44.2, 44.11; 210/167.12, 210/167.13, 97, 416.1, 416.2
See application file for complete search history.

(56) References Cited

U.S. PATENT DOCUMENTS

| | | | |
|---|---|---|---|
| 1,061,919 A | 5/1913 | Miller |
| 1,993,267 A | 3/1935 | Ferguson |
| 2,238,597 A | 4/1941 | Page |
| 2,458,006 A | 1/1949 | Kilgore |

(Continued)

FOREIGN PATENT DOCUMENTS

| | | |
|---|---|---|
| DE | 3023463 | 2/1981 |
| DE | 19736079 | 8/1997 |

(Continued)

OTHER PUBLICATIONS

"Better, Stronger, Faster;" Pool & Spa News, Sep. 3, 2004; pp. 52-54, 82-84, USA.

(Continued)

*Primary Examiner* — Charles Freay
*Assistant Examiner* — Christopher Bobish
(74) *Attorney, Agent, or Firm* — Quarles & Brady LLP

(57) ABSTRACT

A pumping system for moving water of a swimming pool includes a water pump, a variable speed motor, and a filter arrangement in fluid communication with the pump. The pumping system can also include means for determining a load value indicative of an unclogged filter that permits movement of water through the filter arrangement, means for determining a load value indicative of a clogged filter that inhibits movement of water through the filter arrangement, and means for determining a performance value of the pumping system. The pumping system also includes means for determining a relative loading value of the filter arrangement, means for displaying the relative loading value, and means for controlling the motor in response to the relative loading value. In one example, the load values and performance value can include flow pressure values. A method of moving water of a swimming pool is also disclosed.

22 Claims, 7 Drawing Sheets

U.S. PATENT DOCUMENTS

| | | | |
|---|---|---|---|
| 2,488,365 A | 11/1949 | Abbott et al. | |
| 2,494,200 A | 1/1950 | Ramqvist | |
| 2,615,937 A | 10/1952 | Ludwig et al. | |
| 2,716,195 A | 8/1955 | Anderson | |
| 2,767,277 A | 10/1956 | Wirth | |
| 2,778,958 A | 1/1957 | Hamm et al. | |
| 2,881,337 A | 4/1959 | Wall | |
| 3,191,935 A | 6/1965 | Uecker | |
| 3,213,304 A | 10/1965 | Landerg et al. | |
| 3,227,808 A | 1/1966 | Morris | |
| 3,291,058 A | 12/1966 | McParlin | |
| 3,481,973 A | 12/1969 | Wygant | |
| 3,558,910 A | 1/1971 | Dale et al. | |
| 3,559,731 A | 2/1971 | Stafford | |
| 3,581,895 A | 6/1971 | Howard et al. | |
| 3,613,805 A | 10/1971 | Lindstad | |
| 3,737,749 A | 6/1973 | Schmit | |
| 3,778,804 A | 12/1973 | Adair | |
| 3,787,882 A | 1/1974 | Fillmore | |
| 3,838,597 A | 10/1974 | Montgomery et al. | |
| 3,949,782 A | 4/1976 | Athey et al. | |
| 3,953,777 A | 4/1976 | McKee | |
| 3,963,375 A | 6/1976 | Curtis | |
| 4,021,700 A | 5/1977 | Ellis-Anwyl | |
| 4,041,470 A | 8/1977 | Slane et al. | |
| 4,123,792 A | 10/1978 | Gephart et al. | |
| 4,133,058 A | 1/1979 | Baker | |
| 4,151,080 A | 4/1979 | Zuckerman et al. | |
| 4,168,413 A | 9/1979 | Halpine | |
| 4,225,290 A | 9/1980 | Allington | |
| 4,241,299 A | 12/1980 | Bertone | |
| 4,263,535 A | 4/1981 | Jones | |
| 4,286,303 A | 8/1981 | Genheimer et al. | |
| 4,319,712 A | 3/1982 | Bar | |
| 4,322,297 A | 3/1982 | Bajka | |
| 4,353,220 A | 10/1982 | Curwen | |
| 4,370,098 A | 1/1983 | McClain et al. | |
| 4,402,094 A | 9/1983 | Sanders | |
| 4,419,625 A | 12/1983 | Bejot et al. | |
| 4,420,787 A | 12/1983 | Tibbits et al. | |
| 4,421,643 A | 12/1983 | Frederick | |
| 4,427,545 A * | 1/1984 | Arguilez | 210/333.1 |
| 4,449,260 A | 5/1984 | Whitaker | |
| 4,470,092 A | 9/1984 | Lombardi | |
| 4,473,338 A | 9/1984 | Garmong | |
| 4,494,180 A | 1/1985 | Streater | |
| 4,504,773 A | 3/1985 | Suzuki et al. | |
| 4,505,643 A | 3/1985 | Millis et al. | |
| D278,529 S | 4/1985 | Hoogner | |
| 4,541,029 A | 9/1985 | Ohyama | |
| 4,545,906 A * | 10/1985 | Frederick | 210/138 |
| 4,610,605 A | 9/1986 | Hartley | |
| 4,620,835 A | 11/1986 | Bell | |
| 4,635,441 A | 1/1987 | Ebbing et al. | |
| 4,647,825 A | 3/1987 | Profio et al. | |
| 4,676,914 A | 6/1987 | Mills et al. | |
| 4,678,404 A | 7/1987 | Lorett et al. | |
| 4,678,409 A | 7/1987 | Kurokawa | |
| 4,686,439 A | 8/1987 | Cunningham et al. | |
| 4,695,779 A | 9/1987 | Yates | |
| 4,703,387 A | 10/1987 | Miller | |
| 4,705,629 A * | 11/1987 | Weir et al. | 210/340 |
| 4,758,697 A | 7/1988 | Jeuneu | |
| 4,767,280 A | 8/1988 | Markuson | |
| 4,780,050 A | 10/1988 | Caine et al. | |
| 4,795,314 A | 1/1989 | Prybella | |
| 4,827,197 A | 5/1989 | Giebeler | |
| 4,834,624 A | 5/1989 | Jensen | |
| 4,837,656 A | 6/1989 | Barnes | |
| 4,841,404 A | 6/1989 | Marshall et al. | |
| 4,864,287 A | 9/1989 | Kierstead | |
| 4,885,655 A | 12/1989 | Springer et al. | |
| 4,891,569 A | 1/1990 | Light | |
| 4,907,610 A | 3/1990 | Meincke | |
| 4,912,936 A | 4/1990 | Denpou | |
| 4,913,625 A | 4/1990 | Gerlowski | |
| 4,963,778 A | 10/1990 | Jensen | |
| 4,971,522 A | 11/1990 | Butlin | |
| 4,977,394 A | 12/1990 | Manson et al. | |
| 4,985,181 A | 1/1991 | Strada et al. | |
| 4,986,919 A | 1/1991 | Allington | |
| 4,996,646 A | 2/1991 | Farrington | |
| D315,315 S | 3/1991 | Stairs, Jr. | |
| 4,998,097 A | 3/1991 | Noth et al. | |
| 5,026,256 A | 6/1991 | Kuwabara | |
| 5,076,761 A | 12/1991 | Krohn et al. | |
| 5,076,763 A | 12/1991 | Anastos et al. | |
| 5,079,784 A | 1/1992 | Rist et al. | |
| 5,099,181 A | 3/1992 | Canon | |
| 5,100,298 A | 3/1992 | Shibata et al. | |
| RE33,874 E | 4/1992 | Miller | |
| 5,117,233 A | 5/1992 | Hamos et al. | |
| 5,123,080 A | 6/1992 | Gillett | |
| 5,151,017 A | 9/1992 | Sears et al. | |
| 5,156,535 A | 10/1992 | Budris | |
| 5,158,436 A | 10/1992 | Jensen | |
| 5,159,713 A | 10/1992 | Gaskill et al. | |
| 5,167,041 A | 12/1992 | Burkitt | |
| 5,172,089 A | 12/1992 | Wright et al. | |
| D334,542 S | 4/1993 | Lowe | |
| 5,240,380 A | 8/1993 | Mabe | |
| 5,324,170 A | 6/1994 | Anastos et al. | |
| 5,327,036 A | 7/1994 | Carey | |
| 5,342,176 A | 8/1994 | Redlich | |
| 5,418,984 A | 5/1995 | Livingston, Jr. | |
| D359,458 S | 6/1995 | Pierret | |
| D363,060 S | 10/1995 | Hunger | |
| 5,471,125 A | 11/1995 | Wu | |
| 5,473,497 A | 12/1995 | Beatty | |
| 5,499,902 A | 3/1996 | Rockwood | |
| 5,511,397 A | 4/1996 | Makino et al. | |
| 5,512,883 A | 4/1996 | Lane | |
| 5,518,371 A | 5/1996 | Wellstein | |
| 5,519,848 A | 5/1996 | Wloka | |
| 5,520,517 A | 5/1996 | Sipin | |
| 5,540,555 A | 7/1996 | Corso et al. | |
| D372,719 S | 8/1996 | Jensen | |
| 5,545,012 A | 8/1996 | Anastos et al. | |
| 5,548,854 A | 8/1996 | Bloemer et al. | |
| 5,550,753 A | 8/1996 | Tompkins et al. | |
| 5,559,762 A | 9/1996 | Sakamoto | |
| D375,908 S | 11/1996 | Schumaker | |
| 5,570,481 A | 11/1996 | Mathis et al. | |
| 5,571,000 A | 11/1996 | Zimmermann | |
| 5,577,890 A | 11/1996 | Nielsen et al. | |
| 5,580,221 A | 12/1996 | Triezenberg | |
| 5,598,080 A | 1/1997 | Jensen | |
| 5,604,491 A | 2/1997 | Coonley et al. | |
| 5,614,812 A | 3/1997 | Wagoner | |
| 5,626,464 A | 5/1997 | Schoenmeyr | |
| 5,628,896 A | 5/1997 | Klingenberger | |
| 5,633,540 A | 5/1997 | Moan | |
| 5,672,050 A | 9/1997 | Webber et al. | |
| 5,682,624 A | 11/1997 | Ciochetti | |
| 5,690,476 A | 11/1997 | Miller | |
| 5,711,483 A | 1/1998 | Hays | |
| 5,713,320 A | 2/1998 | Pfaff et al. | |
| 5,727,933 A | 3/1998 | Laskaris | |
| 5,730,861 A | 3/1998 | Sterghos et al. | |
| 5,731,673 A | 3/1998 | Gilmore | |
| 5,739,648 A | 4/1998 | Ellis et al. | |
| 5,754,421 A | 5/1998 | Nystrom | |
| 5,767,606 A | 6/1998 | Bresolin | |
| 5,777,833 A | 7/1998 | Romillon | |
| 5,791,882 A | 8/1998 | Stucker | |
| 5,804,080 A | 9/1998 | Klingenberger | |
| 5,819,848 A | 10/1998 | Rasmuson | |
| 5,820,350 A | 10/1998 | Mantey et al. | |
| 5,828,200 A | 10/1998 | Ligman et al. | |
| 5,833,437 A | 11/1998 | Kurth et al. | |
| 5,836,271 A | 11/1998 | Sasaki | |
| 5,863,185 A | 1/1999 | Cochimin et al. | |
| 5,883,489 A | 3/1999 | Konrad | |
| 5,894,609 A | 4/1999 | Barnett | |
| 5,907,281 A | 5/1999 | Miller, Jr. et al. | |
| 5,909,372 A | 6/1999 | Thybo | |
| 5,914,881 A | 6/1999 | Trachier | |

| | | | | | | |
|---|---|---|---|---|---|---|
| 5,920,264 | A | 7/1999 | Kim et al. | 6,534,940 B2 | 3/2003 | Bell et al. |
| 5,930,092 | A | 7/1999 | Nystrom | 6,534,947 B2 | 3/2003 | Johnson et al. |
| 5,941,690 | A | 8/1999 | Lin | 6,537,032 B1 | 3/2003 | Horiuchi |
| 5,945,802 | A | 8/1999 | Konrad | 6,548,976 B2 | 4/2003 | Jensen |
| 5,947,689 | A | 9/1999 | Schick | 6,591,697 B2 | 7/2003 | Henyan |
| 5,947,700 | A | 9/1999 | McKain et al. | 6,604,909 B2 | 8/2003 | Schoenmeyr |
| 5,959,534 | A | 9/1999 | Campbell et al. | 6,623,245 B2 | 9/2003 | Meza |
| 5,961,291 | A | 10/1999 | Sakagami | 6,636,135 B1 | 10/2003 | Vetter |
| 5,969,958 | A | 10/1999 | Nielsen | D482,664 S | 11/2003 | Hunt |
| 5,973,465 | A | 10/1999 | Rayner | 6,651,900 B1 | 11/2003 | Yoshida |
| 5,983,146 | A | 11/1999 | Sarbach | 6,672,147 B1 * | 1/2004 | Mazet ........................ 73/114.43 |
| 5,991,939 | A | 11/1999 | Mulvey | 6,676,831 B1 | 1/2004 | Wolfe |
| 6,030,180 | A | 2/2000 | Clarey et al. | 6,690,250 B2 | 2/2004 | Møller |
| 6,037,742 | A | 3/2000 | Rasmussen | 6,696,676 B1 | 2/2004 | Graves et al. |
| 6,043,461 | A | 3/2000 | Holling et al. | 6,709,240 B1 | 3/2004 | Schmalz et al. |
| 6,045,331 | A | 4/2000 | Gehm et al. | 6,709,575 B1 * | 3/2004 | Verdegan et al. ............. 210/108 |
| 6,045,333 | A | 4/2000 | Breit | 6,715,996 B2 | 4/2004 | Moeller |
| 6,046,492 | A | 4/2000 | Machida | 6,717,318 B1 | 4/2004 | Mathiassen |
| 6,048,183 | A | 4/2000 | Meza | 6,732,387 B1 | 5/2004 | Waldron |
| 6,059,536 | A | 5/2000 | Stingl | D490,726 S | 6/2004 | Eungprabhanth |
| 6,065,946 | A | 5/2000 | Lathrop | 6,747,367 B2 | 6/2004 | Cline |
| 6,072,291 | A | 6/2000 | Pedersen | 6,770,043 B1 | 8/2004 | Kahn |
| 6,091,604 | A | 7/2000 | Plougsgaard | 6,774,664 B2 | 8/2004 | Godbersen |
| D429,699 | S | 8/2000 | Davis | 6,799,950 B2 | 10/2004 | Meier et al. |
| D429,700 | S | 8/2000 | Liebig | 6,806,677 B2 | 10/2004 | Kelly et al. |
| 6,098,654 | A | 8/2000 | Cohen et al. | 6,837,688 B2 | 1/2005 | Kimberlin et al. |
| 6,102,665 | A | 8/2000 | Centers | 6,842,117 B2 | 1/2005 | Keown |
| 6,116,040 | A | 9/2000 | Stark | 6,847,854 B2 | 1/2005 | Discenzo |
| 6,121,746 | A | 9/2000 | Fisher et al. | 6,863,502 B2 | 3/2005 | Bishop et al. |
| 6,125,481 | A | 10/2000 | Sicilano | 6,875,961 B1 | 4/2005 | Collins |
| 6,142,741 | A | 11/2000 | Nishihata | 6,884,022 B2 | 4/2005 | Albright |
| 6,157,304 | A | 12/2000 | Bennett et al. | D504,900 S | 5/2005 | Wang |
| 6,171,073 | B1 | 1/2001 | McKain et al. | D505,429 S | 5/2005 | Wang |
| 6,178,393 | B1 | 1/2001 | Irvin | 6,888,537 B2 | 5/2005 | Benson et al. |
| 6,199,224 | B1 | 3/2001 | Versland | D507,243 S | 7/2005 | Miller |
| 6,208,112 | B1 | 3/2001 | Jensen | 6,925,823 B2 | 8/2005 | Lifson et al. |
| 6,227,808 | B1 | 5/2001 | McDonough | 6,933,693 B2 | 8/2005 | Schuchmann |
| 6,238,188 | B1 | 5/2001 | Lifson | 6,941,785 B2 | 9/2005 | Haynes et al. |
| 6,249,435 | B1 | 6/2001 | Vicente et al. | D511,530 S | 11/2005 | Wang |
| 6,253,227 | B1 | 6/2001 | Tompkins et al. | D512,026 S | 11/2005 | Nurmi |
| D445,405 | S | 7/2001 | Schneider | 6,965,815 B1 | 11/2005 | Tompkins et al. |
| 6,254,353 | B1 | 7/2001 | Polo | D512,440 S | 12/2005 | Wang |
| 6,257,304 | B1 | 7/2001 | Jacobs et al. | 6,976,052 B2 | 12/2005 | Tompkins et al. |
| 6,259,617 | B1 | 7/2001 | Wu | D513,737 S | 1/2006 | Riley |
| 6,264,431 | B1 | 7/2001 | Triezenberg | 6,984,158 B2 | 1/2006 | Satoh |
| 6,264,432 | B1 | 7/2001 | Kilayko et al. | 6,989,649 B2 | 1/2006 | Mehlhorn |
| 6,280,611 | B1 | 8/2001 | Henkin et al. | 6,993,414 B2 * | 1/2006 | Shah ............................ 700/276 |
| 6,299,414 | B1 | 10/2001 | Schoenmeyr | 7,005,818 B2 | 2/2006 | Jensen |
| 6,299,699 | B1 | 10/2001 | Porat et al. | 7,040,107 B2 | 5/2006 | Lee et al. |
| 6,326,752 | B1 | 12/2001 | Jensen | 7,050,278 B2 | 5/2006 | Poulsen |
| 6,330,525 | B1 | 12/2001 | Hays | 7,080,508 B2 | 7/2006 | Stavale |
| 6,342,841 | B1 | 1/2002 | Stingl | 7,083,392 B2 | 8/2006 | Meza et al. |
| 6,349,268 | B1 | 2/2002 | Ketonen et al. | 7,114,926 B2 | 10/2006 | Oshita |
| 6,351,359 | B1 | 2/2002 | Jæger | 7,117,120 B2 | 10/2006 | Beck et al. |
| 6,354,805 | B1 | 3/2002 | Moller | D533,512 S | 12/2006 | Nakashima |
| 6,362,591 | B1 | 3/2002 | Moberg | 7,183,741 B2 | 2/2007 | Mehlhorn |
| 6,364,621 | B1 | 4/2002 | Yamauchi | 7,221,121 B2 | 5/2007 | Skaug et al. |
| 6,373,204 | B1 | 4/2002 | Peterson | 7,244,106 B2 | 7/2007 | Kallman |
| 6,373,728 | B1 | 4/2002 | Aarestrup | D562,349 S | 2/2008 | Bulter |
| 6,380,707 | B1 | 4/2002 | Rosholm et al. | D567,189 S | 4/2008 | Stiles, Jr. |
| 6,388,642 | B1 | 5/2002 | Cotis | D582,797 S | 12/2008 | Fraser |
| 6,390,781 | B1 | 5/2002 | McDonough | D583,828 S | 12/2008 | Li |
| 6,399,781 | B1 | 6/2002 | Gupton | 7,542,251 B2 | 6/2009 | Ivankovic |
| 6,406,265 | B1 | 6/2002 | Hahn | 7,690,897 B2 | 4/2010 | Branecky |
| 6,415,808 | B2 | 7/2002 | Joshi | 7,777,435 B2 | 8/2010 | Aguilar |
| 6,416,295 | B1 | 7/2002 | Nagai | 7,821,215 B2 | 10/2010 | Koehl |
| 6,426,633 | B1 | 7/2002 | Thybo | 7,874,808 B2 | 1/2011 | Stiles |
| 6,447,446 | B1 | 9/2002 | Smith et al. | 2001/0041139 A1 | 11/2001 | Sabini et al. |
| 6,450,771 | B1 | 9/2002 | Centers | 2002/0010839 A1 | 1/2002 | Tirumala et al. |
| 6,464,464 | B2 | 10/2002 | Sabini | 2002/0018721 A1 | 2/2002 | Kobayashi |
| 6,468,042 | B2 | 10/2002 | Moller | 2002/0032491 A1 | 3/2002 | Imamura et al. |
| 6,468,052 | B2 | 10/2002 | McKain et al. | 2002/0050490 A1 | 5/2002 | Pittman |
| 6,474,949 | B1 | 11/2002 | Arai | 2002/0070875 A1 | 6/2002 | Crumb |
| 6,481,973 | B1 | 11/2002 | Struthers | 2002/0082727 A1 | 6/2002 | Laflamme et al. |
| 6,483,378 | B2 | 11/2002 | Blodgett | 2002/0131866 A1 | 9/2002 | Phillips |
| 6,493,227 | B2 | 12/2002 | Nielsen et al. | 2002/0136642 A1 | 9/2002 | Moller |
| 6,501,629 | B1 | 12/2002 | Marriott | 2002/0150476 A1 | 10/2002 | Lucke et al. |
| 6,504,338 | B1 | 1/2003 | Eichorn | 2002/0176783 A1 | 11/2002 | Moeller |
| 6,522,034 | B1 | 2/2003 | Nakayama | 2002/0190687 A1 | 12/2002 | Bell et al. |

| | | |
|---|---|---|
| 2003/0017055 A1 | 1/2003 | Fong |
| 2003/0034284 A1 | 2/2003 | Wolfe |
| 2003/0061004 A1 | 3/2003 | Discenzo |
| 2003/0063900 A1 | 4/2003 | Wang et al. |
| 2003/0099548 A1 | 5/2003 | Meza |
| 2003/0106147 A1 | 6/2003 | Cohen et al. |
| 2003/0174450 A1 | 9/2003 | Nakajima et al. |
| 2003/0196942 A1 | 10/2003 | Jones |
| 2004/0000525 A1 | 1/2004 | Hornsby |
| 2004/0006486 A1 | 1/2004 | Schmidt et al. |
| 2004/0009075 A1 | 1/2004 | Meza |
| 2004/0013531 A1 | 1/2004 | Curry et al. |
| 2004/0016241 A1 | 1/2004 | Street |
| 2004/0025244 A1 | 2/2004 | Loyd et al. |
| 2004/0055363 A1 | 3/2004 | Bristol |
| 2004/0062658 A1 | 4/2004 | Beck et al. |
| 2004/0090197 A1 | 5/2004 | Schuchmann |
| 2004/0117330 A1 | 6/2004 | Ehlers et al. |
| 2004/0149666 A1 * | 8/2004 | Leaverton ............ 210/767 |
| 2004/0265134 A1 | 12/2004 | Iimura |
| 2005/0050908 A1 | 3/2005 | Lee et al. |
| 2005/0095150 A1 | 5/2005 | Leone et al. |
| 2005/0123408 A1 | 6/2005 | Koehl |
| 2005/0137720 A1 | 6/2005 | Spira et al. |
| 2005/0170936 A1 | 8/2005 | Quinn |
| 2005/0180868 A1 | 8/2005 | Miller |
| 2005/0190094 A1 | 9/2005 | Andersen |
| 2005/0193485 A1 | 9/2005 | Wolfe |
| 2005/0226731 A1 | 10/2005 | Mehlhorn et al. |
| 2005/0260079 A1 | 11/2005 | Allen |
| 2006/0045750 A1 | 3/2006 | Stiles |
| 2006/0045751 A1 | 3/2006 | Beckman et al. |
| 2006/0090255 A1 | 5/2006 | Cohen |
| 2006/0127227 A1 | 6/2006 | Mehlhorn |
| 2006/0138033 A1 | 6/2006 | Hoal et al. |
| 2006/0146462 A1 | 7/2006 | McMillian, IV |
| 2006/0169322 A1 | 8/2006 | Torkelson |
| 2006/0204367 A1 | 9/2006 | Meza |
| 2007/0001635 A1 | 1/2007 | Ho |
| 2007/0041845 A1 | 2/2007 | Freudenberger |
| 2007/0061051 A1 | 3/2007 | Maddox |
| 2007/0113647 A1 | 5/2007 | Mehlhorn |
| 2007/0114162 A1 | 5/2007 | Stiles et al. |
| 2007/0124321 A1 | 5/2007 | Szydlo |
| 2007/0154319 A1 | 7/2007 | Stiles |
| 2007/0154320 A1 | 7/2007 | Stiles |
| 2007/0154321 A1 | 7/2007 | Stiles et al. |
| 2007/0154322 A1 | 7/2007 | Stiles |
| 2007/0154323 A1 | 7/2007 | Stiles |
| 2007/0160480 A1 | 7/2007 | Ruffo |
| 2007/0163929 A1 | 7/2007 | Stiles et al. |
| 2007/0183902 A1 | 8/2007 | Stiles |
| 2007/0187185 A1 | 8/2007 | Abraham et al. |
| 2007/0212210 A1 | 9/2007 | Kernan et al. |
| 2007/0212229 A1 | 9/2007 | Stavale et al. |
| 2007/0212230 A1 | 9/2007 | Stavale et al. |
| 2008/0003114 A1 | 1/2008 | Levin et al. |
| 2008/0039977 A1 | 2/2008 | Clark et al. |
| 2008/0041839 A1 | 2/2008 | Tran |
| 2008/0063535 A1 | 3/2008 | Koehl |
| 2008/0095638 A1 | 4/2008 | Branecky |
| 2008/0095639 A1 | 4/2008 | Bartos et al. |
| 2008/0131286 A1 | 6/2008 | Koehl |
| 2008/0131289 A1 | 6/2008 | Koehl |
| 2008/0131291 A1 | 6/2008 | Koehl |
| 2008/0131294 A1 | 6/2008 | Koehl |
| 2008/0131295 A1 | 6/2008 | Koehl |
| 2008/0131296 A1 | 6/2008 | Koehl |
| 2008/0140353 A1 | 6/2008 | Koehl |
| 2008/0152508 A1 | 6/2008 | Meza |
| 2008/0168599 A1 | 7/2008 | Caudill et al. |
| 2008/0181785 A1 | 7/2008 | Koehl |
| 2008/0181786 A1 | 7/2008 | Meza |
| 2008/0181787 A1 | 7/2008 | Koehl |
| 2008/0181788 A1 | 7/2008 | Meza |
| 2008/0181789 A1 | 7/2008 | Koehl |
| 2008/0181790 A1 | 7/2008 | Meza |
| 2008/0189885 A1 | 8/2008 | Erlich et al. |
| 2008/0260540 A1 | 10/2008 | Koehl |
| 2008/0288115 A1 | 11/2008 | Rusnak et al. |
| 2009/0014044 A1 | 1/2009 | Hartman et al. |
| 2009/0104044 A1 | 4/2009 | Koehl |
| 2009/0204237 A1 | 8/2009 | Sustaeta |
| 2009/0204267 A1 | 8/2009 | Sustaeta |
| 2009/0210081 A1 | 8/2009 | Sustaeta |
| 2010/0306001 A1 | 12/2010 | Discenzo |
| 2011/0044823 A1 | 2/2011 | Stiles |
| 2011/0052416 A1 | 3/2011 | Stiles |
| 2012/0020810 A1 | 1/2012 | Stiles, Jr. |
| 2012/0100010 A1 | 4/2012 | Stiles, Jr. |

FOREIGN PATENT DOCUMENTS

| | | |
|---|---|---|
| DE | 19645129 | 5/1998 |
| DE | 10231773 | 2/2004 |
| DE | 19938490 | 4/2005 |
| EP | 246769 | 5/1986 |
| EP | 0306814 | 3/1989 |
| EP | 0314249 | 5/1989 |
| EP | 0709575 | 5/1996 |
| EP | 833436 | 9/1996 |
| EP | 0735273 | 10/1996 |
| EP | 0831188 | 3/1998 |
| EP | 0978657 | 2/2000 |
| EP | 1134421 | 9/2001 |
| FR | 2529965 | 6/1983 |
| FR | 2703409 | 10/1994 |
| GB | 2124304 | 6/1983 |
| JP | 5010270 | 1/1993 |
| WO | WO 98/04835 | 2/1998 |
| WO | WO00/42339 | 7/2000 |
| WO | WO 01/47099 | 6/2001 |
| WO | WO03/099705 | 12/2003 |
| WO | WO 2004/006416 | 1/2004 |
| WO | WO 2004/073772 * | 9/2004 |
| WO | WO2004/073772 | 9/2004 |
| WO | WO 2004/088694 | 10/2004 |
| WO | WO 2006/069568 | 7/2006 |

OTHER PUBLICATIONS

54DX30-Sabbagh et al.; "A Model for Optimal . . . Control of Pumping Stations in Irrigation Systems;" Jul. 1988; NL pp. 119-133; Civil Action 5:11-cv-00459D.

54DX31-Danfoss; "VLT 5000 FLUX Aqua DeviceNet Instruction Manual;" Apr. 28, 2003; pp. 1-39; cited in Civil Action 5:11-cv-00459D.

54DX32-Danfoss, "VLT 5000 FLUX Aqua Profibus Operating Instructions;" May 22, 2003; 1-64; cited in Civil Action 5:11-cv-00459D.

54DX33-Pentair, "IntelliTouch Owner's Manual Set-Up & Programming;" May 22, 2003; Sanford, NC; pp. 1-61; cited in Civil Action 5:11-cv-00459D.

54DX34-Pentair; "Compool 3800 Pool-Spa Control System Installation & Operating Instructions;" Nov. 7, 1997; pp. 1-45; cited in Civil Action 5:11-cv-00459D.

54DX35-Pentair Advertisement in "Pool & Spa News;" Mar. 22, 2002; pp. 1-3; cited in Civil Action 5:11-cv-00459D.

54DX36-Hayward; "Pro-Series High-Rate Sand Filter Owner's Guide;" 2002; Elizabeth, NJ; pp. 1-5; cited in Civil Action 5:11-cv-00459D.

54DX37-Danfoss; "VLT 8000 Aqua Fact Sheet;" Jan. 2002; pp. 1-3; cited in Civil Action 5:11-cv-00459D.

54DX38-Danfoss; "VLT 6000 Series Installation, Operation & Maintenance Manual;" Mar. 2000; pp. 1-118; cited in Civil Action 5:11-cv-00459D.

"Product Focus—New AC Drive Series Targets Water, Wastewater Applications;" WaterWorld Article; Jul. 2002; pp. 1-2.

54DX18-Stmicroelectronics; "STAN1946—Sensorless BLDC Motor Control & BEMF Sampling Methods with ST7MC;" 2007; pp. 1-35; Civil Action 5:11-cv-00459D; 2007.

54DX19-Stmicroelectronics; "STAN1276 BLDC Motor Start Routine for ST72141 Microcontroller;" 2000; pp. 1-18; cited in Civil Action 5:11-cv-00459D.

54DX21-Danfoss; "VLT 8000 Aqua Instruction Manual;" Apr. 2004; 1-140; cited in Civil Action 5:11-cv-00459D.

54DX22-Danfoss; "VLT 8000 Aqua Instruction Manual;" Undated; pp. 1-35; cited in Civil Action 5:11-cv-00459D.

54DX23-Commander; "Commander SE Advanced User Guide;" Nov. 2002; pp. 1-118; cited in Civil Action 5:11-cv-00459D.

PX34-Pentair; "IntelliTouch Pool & Spa Control System User's Guide;" pp. 1-129; 2011; cited in Civil Action 5:11-cv-00459D.

PX138-Deposition of Dr. Douglas C. Hopkins; pp. 1-391; 2011; cited in Civil Action 5:11-cv-00459D.

PX141-Danfoss; Whitepaper Automatic Energy Optimization; pp. 1-4; 2011; cited in Civil Action 5:11-cv-00459D.

Shabnam Mogharabi; "Better, Stronger, Faster;" Pool and Spa News; pp. 1-5; Sep. 3, 2004; www/poolspanews.com.

Pentair Pool Products; "IntelliFlo 4X160 a Breathrough in Energy-Efficiency and Service Life;" pp. 1-4; Nov. 2005; www/pentairpool.com.

Pentair Water Pool and Spa, Inc.; "The Pool Pro's Guide to Breakthrough Efficiency, Convenience & Profitability;" pp. 1-8; Mar. 2006; wwwpentairpool.com.

Grundfos Pumps Corporation; "The New Standard in Submersible Pumps;" Brochure; pp. 1-8; Jun. 1999; Fresno, CA USA.

Grundfos Pumps Corporation; "Grundfos SQ/SQE Data Book;" pp. 1-39; Jun. 1999; Fresno, CA USA.

Goulds Pumps; "Balanced Flow System Brochure;" pp. 1-4; 2001.

Goulds Pumps; "Balanced Flow Submersible System Installation, Operation & Trouble-Shooting Manual;" pp. 1-9; 2000; USA.

Goulds Pumps; "Balanced Flow Submersible System Informational Seminar;" pp. 1-22; Undated.

Goulds Pumps; "Balanced Flow System Variable Speed Submersible Pump" Specification Sheet; pp. 1-2; Jan. 2000; USA.

Goulds Pumps; Advertisement from "Pumps & Systems Magazine;" Jan. 2002; Seneca Falls, NY.

Goulds Pumps; "Hydro-Pro Water System Tank Installation, Operation & Maintenance Instructions;" pp. 1-30; Mar. 31, 2001; Seneca Falls, NY USA.

Goulds Pumps; "Pumpsmart Control Solutions" Advertisement from Industrial Equipment News; Aug. 2002; New York, NY USA.

Goulds Pumps; "Model BFSS List Price Sheet;" Feb. 5, 2001.

Goulds Pumps; "Balanced Flow System Model BFSS Variable Speed Submersible Pump System" Brochure; pp. 1-4; Jan 2001; USA.

Goulds Pumps; "Balanced Flow System Model BFSS Variable Speed Submersible Pump" Brochure; pp. 1-3; Jan. 2000; USA.

Goulds Pumps; "Balanced Flow System . . . The Future of Constant Pressure Has Arrived;" Undated Advertisement.

Amtrol Inc.; "Amtrol Unearths the Facts About Variable Speed Pumps and Constant Pressure Valves;" pp. 1-5; Aug. 2002; West Warwick, RI USA.

Franklin Electric; "CP Water-Subdrive 75 Constant Pressure Controller" Product Data Sheet; May 2001; Bluffton, IN USA.

Franklin Electric; "Franklin Aid, Subdrive 75: You Made It Better;" vol. 20, No. 1; pp. 1-2; Jan./Feb. 2002; www.franklin-electric.com.

Grundfos; "SQ/SQE—A New Standard in Submersible Pumps;" Undated Brochure; pp. 1-14; Denmark.

Grundfos; "JetPaq—The Complete Pumping System;" Undated Brochure; pp. 1-4; Clovis, CA USA.

Email Regarding Grundfos' Price Increases/SQ/SQE Curves; pp. 1-7; Dec. 19, 2001.

F.E. Myers; "Featured Product: F.E. Myers Introducts Revolutionary Constant Pressure Water System;" pp. 1-8; Jun. 28, 2000; Ashland, OH USA.

"Water Pressure Problems" Published Article; The American Well Owner; No. 2, Jul. 2000.

Bjarke Soerensen; "Have You Chatted With Your Pump Today?" Undated Article Reprinted with Permission of Grundfos Pump University; pp. 1-2; USA.

"Understanding Constant Pressure Control;" pp. 1-3; Nov. 1, 1999.

"Constant Pressure is the Name of the Game;" Published Article from National Driller; Mar. 2001.

* cited by examiner

FILTER LOADING

RELATED APPLICATIONS

This application is a continuation-in-part application of U.S. application Ser. No. 10/926,513, filed Aug. 26, 2004, and U.S. application Ser. No. 11/286,888, filed Nov. 23, 2005, the entire disclosures of which are hereby incorporated herein by reference.

FIELD OF THE INVENTION

The present invention relates generally to control of a pump, and more particularly to control of a variable speed pumping system for a pool.

BACKGROUND OF THE INVENTION

Conventionally, a pump to be used in a pool is operable at a finite number of predetermined speed settings (e.g., typically high and low settings). Typically these speed settings correspond to the range of pumping demands of the pool at the time of installation. Factors such as the volumetric flow rate of water to be pumped, the total head pressure required to adequately pump the volume of water, and other operational parameters determine the size of the pump and the proper speed settings for pump operation. Once the pump is installed, the speed settings typically are not readily changed to accommodate changes in the pool conditions and/or pumping demands.

Conventionally, it is also typical to equip a pumping system for use in a pool with a filter arrangement capable of filtering the fluid moved by the pumping system, such as water. The filter arrangement can filter the fluid to remove unwanted impurities and particulates therefrom to maintain the water clarity and chemical balance. However, during use, it is possible that the filter arrangement can become clogged over time so as to inhibit the flow of the water therethrough. Thus, resistance to the flow of water can cause a decrease in the flow rate if the pumping system does not compensate to overcome this resistance. However, merely adjusting the pump to one of a few predetermined settings may cause the pump to operate at a rate that exceeds a needed rate, while adjusting the pump to another setting may cause the pump to operate at a rate that provides an insufficient amount of flow and/or pressure. In such a case, the pump will either operate inefficiently or operate at a level below that which is desired.

Accordingly, it would be beneficial to provide a pump that could be readily and easily adapted to provide a suitable supply of water at a desired pressure to pools having a variety of sizes and features. The pumping system can be configured to monitor the status of the filter arrangement and provide feedback to a user regarding the filter status. Further, the pump should be responsive to a change of conditions (i.e., a clogged filter or the like) and/or user input instructions.

SUMMARY OF THE INVENTION

In accordance with one aspect, the present invention provides a pumping system for moving water of a swimming pool. The pumping system includes a water pump for moving water in connection with performance of a filtering operation upon the water, a variable speed motor operatively connected to drive the pump, and a filter arrangement in fluid communication with the pump. The pumping system also includes means for determining a load value indicative of an unclogged filter that permits movement of water through the filter arrangement, means for determining a load value indicative of a clogged filter that inhibits movement of water through the filter arrangement, and means for determining a performance value of the pumping system. The pumping system also includes means for determining a relative loading value of the filter arrangement based upon the load value indicative of an unclogged filter, load value indicative of a clogged filter, and the performance value. The pumping system also includes means for displaying the relative loading value, and means for controlling the motor in response to the relative loading value.

In accordance with another aspect, the present invention provides a pumping system for moving water of a swimming pool. The pumping system includes a water pump for moving water in connection with performance of a filtering operation upon the water, a variable speed motor operatively connected to drive the pump, and a filter arrangement in fluid communication with the pump. The pumping system also includes means for determining a flow pressure value indicative of an unclogged filter that permits movement of water through the filter arrangement, means for determining a threshold flow pressure value indicative of a clogged filter that inhibits movement of water through the filter arrangement and means for determining an actual pressure value of the pumping system during the filtering operation. The pumping system also includes means for determining a relative loading value of the filter arrangement based upon the pressure value indicative of an unclogged filter, threshold pressure value indicative of a clogged filter, and the actual pressure value, and means for displaying the relative loading value as a percentage with respect to the threshold flow pressure value.

In accordance with another aspect, the present invention provides a pumping system for moving water of a swimming pool. The pumping system includes a water pump for moving water in connection with performance of a filtering operation upon the water, a variable speed motor operatively connected to drive the pump, and a filter arrangement in fluid communication with the pump. The pumping system also includes means for determining a flow pressure value indicative of an unclogged filter that permits movement of water through the filter arrangement, means for determining a threshold flow pressure value indicative of a clogged filter that inhibits movement of water through the filter arrangement, and means for determining an actual pressure value of the pumping system during the filtering operation. The pumping system also includes means for determining a relative loading value of the filter arrangement based upon the pressure value indicative of an unclogged filter, pressure value indicative of a clogged filter, and the actual pressure value, and means for controlling the motor to perform an operation upon the water. The means for controlling is configured to alter operation of the motor when the relative loading value exceeds a predetermined value.

In accordance with yet another aspect, the present invention provides a method of moving water of a swimming pool including a water pump for moving water in connection with performance of a filtering operation upon the water, a variable speed motor operatively connected to drive the pump, and a filter arrangement in fluid communication with the pump. The method comprises the steps of determining a flow pressure value indicative of an unclogged filter that permits movement of water through the filter arrangement, determining a threshold flow pressure value indicative of a clogged filter that inhibits movement of water through the filter arrangement, and determining an actual pressure value of the pumping system during the filtering operation. The method also includes the steps of determining a relative loading value of the filter arrangement based upon the pressure value indicative of an unclogged filter, pressure value indicative of a clogged filter, and the actual pressure value, displaying the relative loading value, and controlling the motor in response to the relative loading value.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF EXAMPLE EMBODIMENTS

Figure 1:
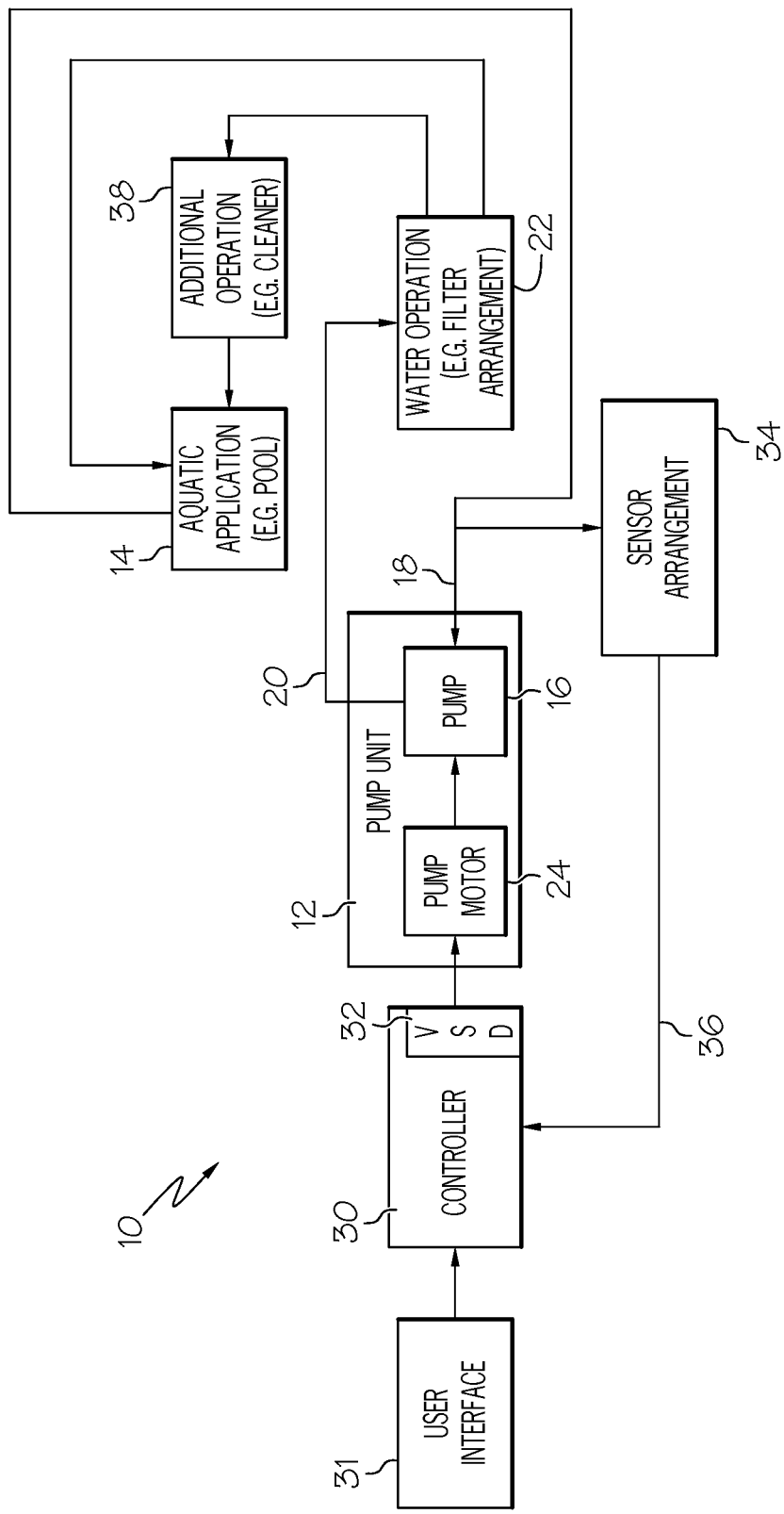
FIG. 1 is a block diagram of an example of a variable speed pumping system in a pool environment in accordance with the present invention.

Certain terminology is used herein for convenience only and is not to be taken as a limitation on the present invention. Further, in the drawings, the same reference numerals are employed for designating the same elements throughout the figures, and in order to clearly and concisely illustrate the present invention, certain features may be shown in somewhat schematic form.

An example variable-speed pumping system 10 in accordance with one aspect of the present invention is schematically shown in FIG. 1. The pumping system 10 includes a pump unit 12 that is shown as being used with a pool 14. It is to be appreciated that the pump unit 12 includes a pump 16 for moving water through inlet and outlet lines 18 and 20.

The swimming pool 14 is one example of a pool. The definition of "swimming pool" includes, but is not limited to, swimming pools, spas, and whirlpool baths. Features and accessories may be associated therewith, such as water jets, waterfalls, fountains, pool filtration equipment, chemical treatment equipment, pool vacuums, spillways and the like.

A water operation 22 is performed upon the water moved by the pump 16. Within the shown example, the water operation 22 is a filter arrangement that is associated with the pumping system 10 and the pool 14 for providing a cleaning operation (i.e., filtering) on the water within the pool. The filter arrangement 22 is operatively connected between the pool 14 and the pump 16 at/along an inlet line 18 for the pump. Thus, the pump 16, the pool 14, the filter arrangement 22, and the interconnecting lines 18 and 20 form a fluid circuit or pathway for the movement of water.

It is to be appreciated that the function of filtering is but one example of an operation that can be performed upon the water. Other operations that can be performed upon the water may be simplistic, complex or diverse. For example, the operation performed on the water may merely be just movement of the water by the pumping system (e.g., re-circulation of the water in a waterfall or spa environment).

Turning to the filter arrangement 22, any suitable construction and configuration of the filter arrangement is possible. For example, the filter arrangement 22 can include a sand filter, a cartridge filter, and/or a diatomaceous earth filter, or the like. In another example, the filter arrangement 22 may include a skimmer assembly for collecting coarse debris from water being withdrawn from the pool, and one or more filter components for straining finer material from the water. In still yet another example, the filter arrangement 22 can be in fluid communication with a pool cleaner, such as a vacuum pool cleaner adapted to vacuum debris from the various submerged surfaces of the pool. The pool cleaner can include various types, such as various manual and/or automatic types.

The pump 16 may have any suitable construction and/or configuration for providing the desired force to the water and move the water. In one example, the pump 16 is a common centrifugal pump of the type known to have impellers extending radially from a central axis. Vanes defined by the impellers create interior passages through which the water passes as the impellers are rotated. Rotating the impellers about the central axis imparts a centrifugal force on water therein, and thus imparts the force flow to the water. Although centrifugal pumps are well suited to pump a large volume of water at a continuous rate, other motor-operated pumps may also be used within the scope of the present invention.

Drive force is provided to the pump 16 via a pump motor 24. In the one example, the drive force is in the form of rotational force provided to rotate the impeller of the pump 16. In one specific embodiment, the pump motor 24 is a permanent magnet motor. In another specific embodiment, the pump motor 24 is an induction motor. In yet another embodiment, the pump motor 24 can be a synchronous or asynchronous motor. The pump motor 24 operation is infinitely variable within a range of operation (i.e., zero to maximum operation). In one specific example, the operation is indicated by the RPM of the rotational force provided to rotate the impeller of the pump 16. In the case of a synchronous motor 24, the steady state speed (RPM) of the motor 24 can be referred to as the synchronous speed. Further, in the case of a synchronous motor 24, the steady state speed of the motor 24 can also be determined based upon the operating frequency in hertz (Hz). Thus, either or both of the pump 16 and/or the motor 24 can be configured to consume power during operation.

A controller 30 provides for the control of the pump motor 24 and thus the control of the pump 16. Within the shown example, the controller 30 includes a variable speed drive 32 that provides for the infinitely variable control of the pump motor 24 (i.e., varies the speed of the pump motor). By way of example, within the operation of the variable speed drive 32, a single phase AC current from a source power supply is converted (e.g., broken) into a three-phase AC current. Any suitable technique and associated construction/configuration may be used to provide the three-phase AC current. The variable speed drive supplies the AC electric power at a changeable frequency to the pump motor to drive the pump motor. The construction and/or configuration of the pump 16, the pump motor 24, the controller 30 as a whole, and the variable speed drive 32 as a portion of the controller 30, are not limitations on the present invention. In one possibility, the pump 16 and the pump motor 24 are disposed within a single housing to form a single unit, and the controller 30 with the variable speed drive 32 are disposed within another single housing to form another single unit. In another possibility, these components are disposed within a single housing to form a single unit. Further still, the controller 30 can receive input from a user interface 31 that can be operatively connected to the controller in various manners.

The pumping system 10 has means used for control of the operation of the pump. In accordance with one aspect of the present invention, the pumping system 10 includes means for sensing, determining, or the like one or more parameters indicative of the operation performed upon the water. Within one specific example, the system includes means for sensing, determining or the like one or more parameters indicative of the movement of water within the fluid circuit.

The ability to sense, determine or the like one or more parameters may take a variety of forms. For example, one or more sensors 34 may be utilized. Such one or more sensors 34 can be referred to as a sensor arrangement. The sensor arrangement 34 of the pumping system 10 would sense one or more parameters indicative of the operation performed upon the water. Within one specific example, the sensor arrangement 34 senses parameters indicative of the movement of water within the fluid circuit. The movement along the fluid circuit includes movement of water through the filter arrangement 22. As such, the sensor arrangement 34 includes at least one sensor used to determine flow rate of the water moving within the fluid circuit and/or includes at least one sensor used to determine flow pressure of the water moving within the fluid circuit. In one example, the sensor arrangement 34 is operatively connected with the water circuit at/adjacent to the location of the filter arrangement 22. It should be appreciated that the sensors of the sensor arrangement 34 may be at different locations than the locations presented for the example. Also, the sensors of the sensor arrangement 34 may be at different locations from each other. Still further, the sensors may be configured such that different sensor portions are at different locations within the fluid circuit. Such a sensor arrangement 34 would be operatively connected 36 to the controller 30 to provide the sensory information thereto.

It is to be noted that the sensor arrangement 34 may accomplish the sensing task via various methodologies, and/or different and/or additional sensors may be provided within the system 10 and information provided therefrom may be utilized within the system. For example, the sensor arrangement 34 may be provided that is associated with the filter arrangement and that senses an operation characteristic associated with the filter arrangement. For example, such a sensor may monitor filter performance. Such monitoring may be as basic as monitoring filter flow rate, filter pressure, or some other parameter that indicates performance of the filter arrangement. Of course, it is to be appreciated that the sensed parameter of operation may be otherwise associated with the operation performed upon the water. As such, the sensed parameter of operation can be as simplistic as a flow indicative parameter such as rate, pressure, etc.

Such indication information can be used by the controller 30, via performance of a program, algorithm or the like, to perform various functions, and examples of such are set forth below. Also, it is to be appreciated that additional functions and features may be separate or combined, and that sensor information may be obtained by one or more sensors.

With regard to the specific example of monitoring flow rate and flow pressure, the information from the sensor arrangement 34 can be used as an indication of impediment or hindrance via obstruction or condition, whether physical, chemical, or mechanical in nature, that interferes with the flow of water from the pool to the pump such as debris accumulation or the lack of accumulation, within the filter arrangement 34. As such, the monitored information can be indicative of the condition of the filter arrangement.

Figure 2:
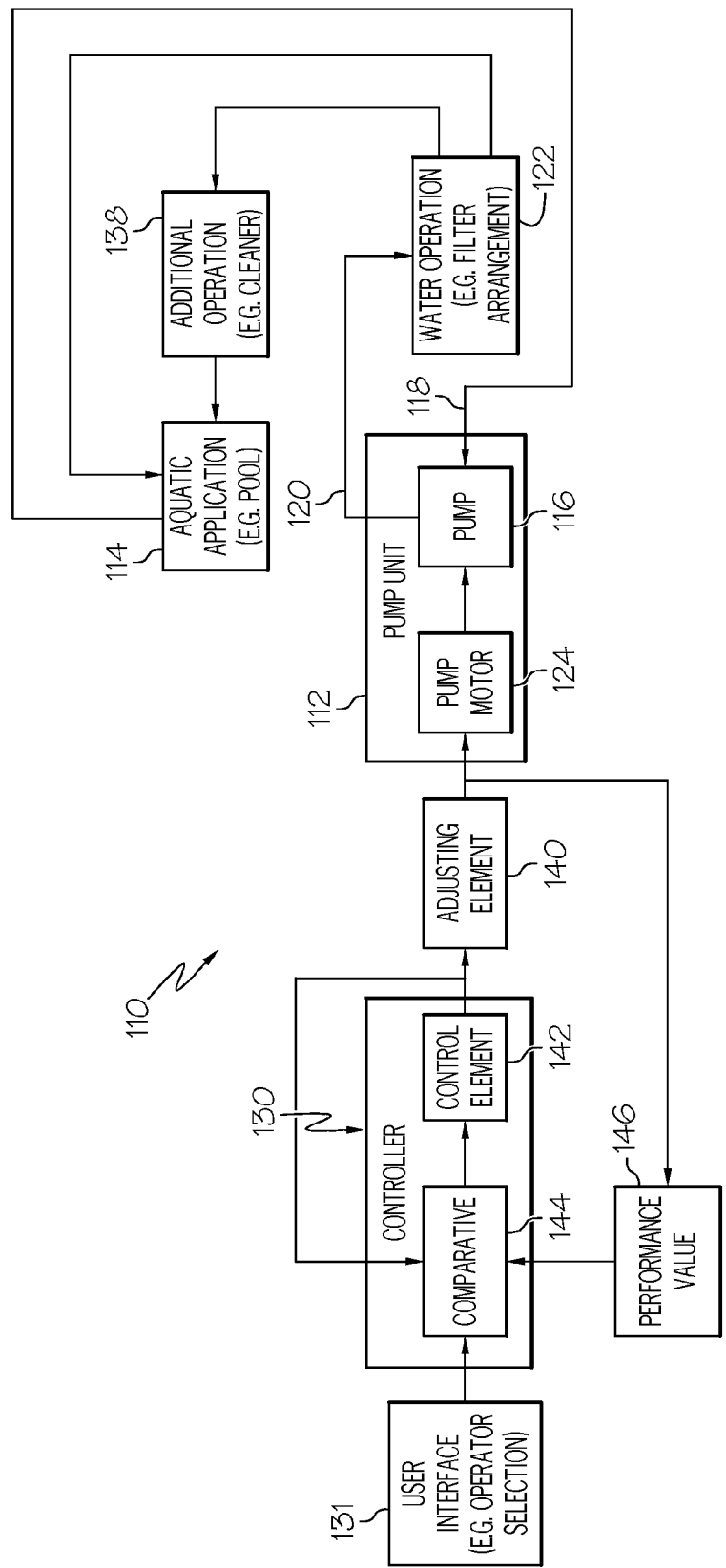
FIG. 2 is another block diagram of another example of a variable speed pumping system in a pool environment in accordance with the present invention.

The example of FIG. 1 shows an example additional operation 38 and the example of FIG. 2 shows an example additional operation 138. Such an additional operation (e.g., 38 or 138) may be a cleaner device, either manual or autonomous. As can be appreciated, an additional operation involves additional water movement. Also, within the presented examples of FIGS. 1 and 2, the water movement is through the filter arrangement (e.g., 22 or 122). Such additional water movement may be used to supplant the need for other water movement.

Within another example (FIG. 2) of a pumping system 110 that includes means for sensing, determining, or the like one or more parameters indicative of the operation performed upon the water, the controller 130 can determine the one or more parameters via sensing, determining or the like parameters associated with the operation of a pump 116 of a pump unit 112. Such an approach is based upon an understanding that the pump operation itself has one or more relationships to the operation performed upon the water.

It should be appreciated that the pump unit 112, which includes the pump 116 and a pump motor 124, a pool 114, a filter arrangement 122, and interconnecting lines 118 and 120, may be identical or different from the corresponding items within the example of FIG. 1. In addition, as stated above, the controller 130 can receive input from a user interface 131 that can be operatively connected to the controller in various manners.

Turning back to the example of FIG. 2, some examples of the pumping system 110, and specifically the controller 130 and associated portions, that utilize at least one relationship between the pump operation and the operation performed upon the water attention are shown in U.S. Pat. No. 6,354,805, to Moller, entitled "Method For Regulating A Delivery Variable Of A Pump" and U.S. Pat. No. 6,468,042, to Moller, entitled "Method For Regulating A Delivery Variable Of A Pump." The disclosures of these patents are incorporated herein by reference. In short summary, direct sensing of the pressure and/or flow rate of the water is not performed, but instead one or more sensed or determined parameters associated with pump operation are utilized as an indication of pump performance. One example of such a pump parameter is input power. Pressure and/or flow rate can be calculated/determined from such pump parameter(s).

Although the system 110 and the controller 130 there may be of varied construction, configuration and operation, the function block diagram of FIG. 2 is generally representative. Within the shown example, an adjusting element 140 is operatively connected to the pump motor and is also operatively connected to a control element 142 within the controller 130. The control element 142 operates in response to a comparative function 144, which receives input from a power calculation 146.

The power calculation 146 is performed utilizing information from the operation of the pump motor 124 and controlled by the adjusting element 140. As such, a feedback iteration is performed to control the pump motor 124. Also, it is the operation of the pump motor and the pump that provides the information used to control the pump motor/pump. As mentioned, it is an understanding that operation of the pump motor/pump has a relationship to the flow rate and/or pressure of the water flow that is utilized to control flow rate and/or flow pressure via control of the pump.

As mentioned, the sensed, determined (e.g., calculated, provided via a look-up table, graph or curve, such as a constant flow curve or the like, etc.) information can be utilized to determine the various performance characteristics of the pumping system 110, such as input power consumed, motor speed, flow rate and/or the flow pressure. In one example, the operation can be configured to prevent damage to a user or to the pumping system 10, 110 caused by an obstruction. Thus, the controller (e.g., 30 or 130) provides the control to operate the pump motor/pump accordingly. In other words, the controller (e.g., 30 or 130) can repeatedly monitor one or more performance value(s) 146 of the pumping system 10,110, such as the input power consumed by, or the speed of, the pump motor (e.g., 24 or 124) to sense or determine a parameter indicative of an obstruction or the like.

Turning to the issue of operation of the system (e.g., 10 or 110) over a course of a long period of time, it is typical that a predetermined volume of water flow is desired. For example, it may be desirable to move a volume of water equal to the volume within the pool. Such movement of water is typically referred to as a turnover. It may be desirable to move a volume of water equal to multiple turnovers within a specified time period (e.g., a day). Within an example in which the water operation includes a filter operation, the desired water movement (e.g., specific number of turnovers within one day) may be related to the necessity to maintain a desired water clarity.

Within the water operation that contains a filter operation, the amount of water that can be moved and/or the ease by which the water can be moved is dependent in part upon the current state (e.g., quality, cleanliness) of the filter arrangement. In general, a clean (e.g., new, fresh, backwashed) filter arrangement provides a lesser impediment to water flow than a filter arrangement that has accumulated filter matter (e.g., dirty). For a constant flow rate through a filter arrangement, a lesser pressure is required to move the water through a clean filter arrangement than a pressure that is required to move the water through a dirty filter arrangement. Another way of considering the effect of dirt accumulation is that if pressure is kept constant then the flow rate will decrease as the dirt accumulates and hinders (e.g., progressively blocks) the flow.

Turning to one aspect that is provided by the present invention, the system can operate to maintain a constant flow of water within the fluid circuit. Maintenance of constant flow is useful in the example that includes a filter arrangement. Moreover, the ability to maintain a constant flow is useful when it is desirable to achieve a specific flow volume during a specific period of time. For example, it may be desirable to filter pool water and achieve a specific number of water turnovers within each day of operation to maintain a desired water clarity despite the fact that the filter arrangement will progressively increase dirt accumulation.

It should be appreciated that maintenance of a constant flow volume despite an increasing impediment caused by filter dirt accumulation can require an increasing pressure and is the result of increasing motive force from the pump/motor. As such, one aspect of the present invention is to control the motor/pump to provide the increased motive force that provides the increased pressure to maintain the constant flow.

Figure 3:
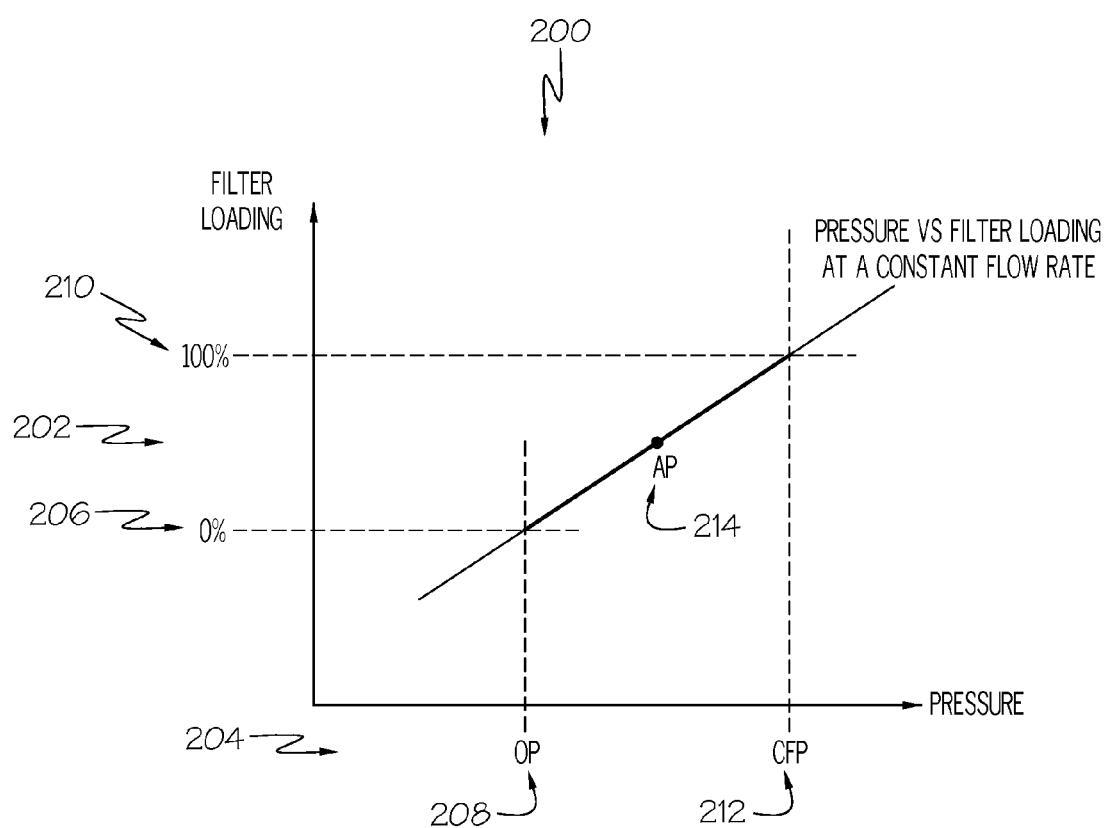
FIG. 3 is a diagram of an example filter loading profile for a filter arrangement between an unclogged condition and a clogged condition.

Turning to one specific example, attention is directed to the filter loading chart 200 that is shown in FIG. 3. The filter loading chart 200 shows a relationship between a relative filter loading value 202 and an associated performance value 204 of the filter arrangement, such as pressure. For example, when the filter arrangement is substantially clean, such as when it is new or after a cleaning operation (e.g., a backwash cycle), the relative filter loading value 206 of the filter arrangement can be approximately 0%. Correspondingly, the associated performance value 208 can indicate an initial or unclogged pressure value (OP) within the filter arrangement at a specific water flow rate. Similarly, when the filter arrangement (e.g., filter, skimmer, pool cleaner, etc.) is substantially dirty and/or clogged, such as after can occur over a period of time, the relative filter loading value 210 can be approximately 100%, while a corresponding performance value 212 can indicate a final or clogged pressure value (CFP) within the filter arrangement at substantially the same water flow rate. Thus, as can be seen from the chart 200, as the filter loading 202 changes (e.g., increases), the associated performance value 204 can also change (e.g., increase), and a relationship can be determined therebetween. In one example, a mathematical relationship can be determined to permit the relative filter loading value 202 to be calculated, or predetermined data can also be collected to permit the relative filter loading value 202 to be determined from a look-up table or the like. For example, as shown, if a performance value 214 (AP) can be determined (e.g., directly or indirectly measured) during the filtration operation, a corresponding filter loading 204 can also be determined (e.g., calculated, look-up table, etc.).

It is to be appreciated that various relationships can be determined between the relative loading value 202 and the performance value 204, and that various performance values 204 can be used (e.g., motor speed, power consumption of the pump unit 12,112 and/or motor 24, 124, flow rate and/or flow pressure of water moved by the pump unit 12, 112, or the like). It is also to be appreciated that although the chart 200 shows an example linear relationship between the relative filter loading value 202 and the performance value 204, various other relationships (e.g., polynomial equation, exponential equation, or the like) can also be used.

Figure 4:
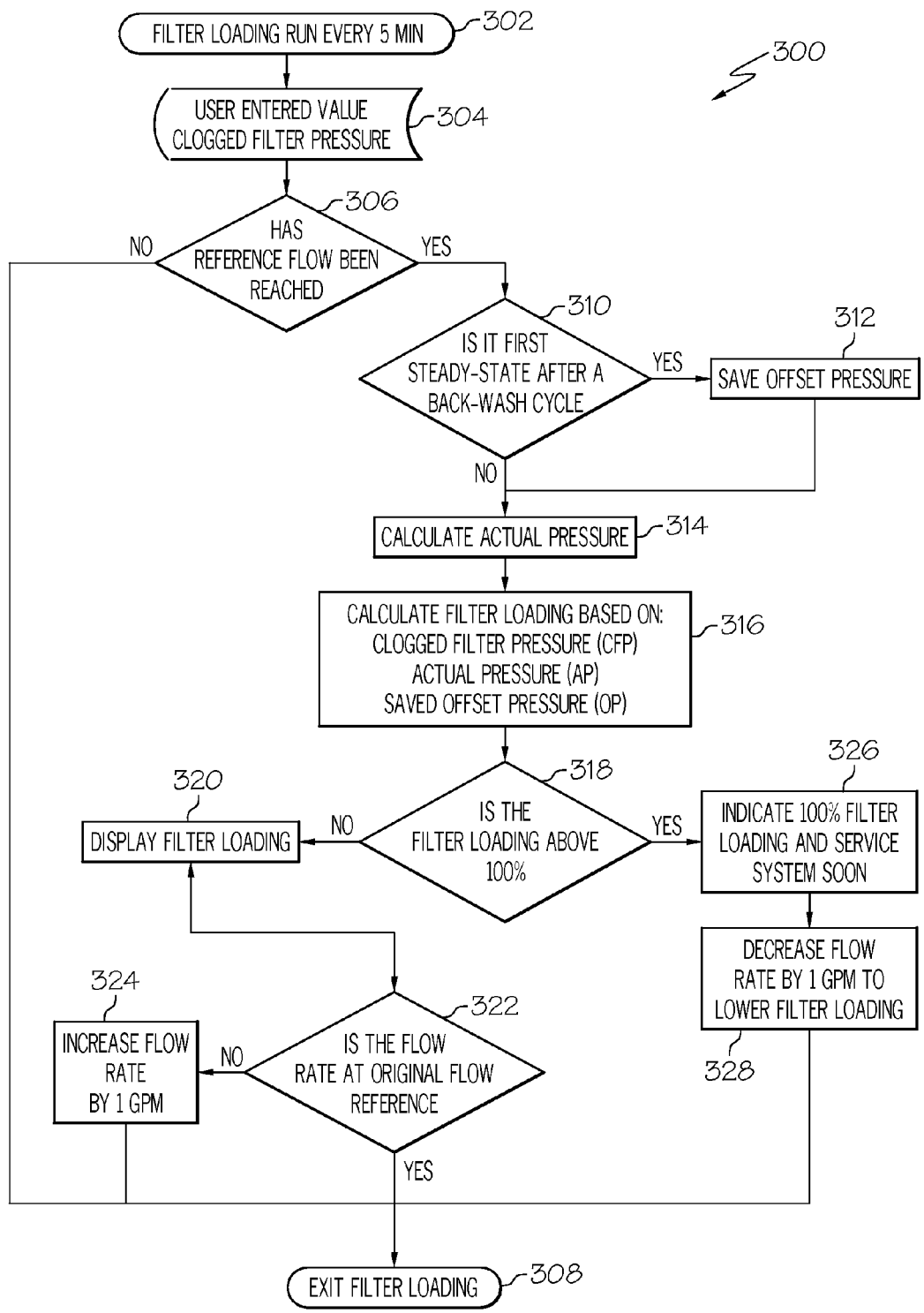
FIG. 4 is a function flow chart for an example methodology in accordance with the present invention.

Turning now to one specific example of a filter loading control system, attention is directed to the block diagram of FIG. 4 that shows an example control system. It is to be appreciated that the block diagram as shown is intended to be only one example method of operation, and that more or less elements can be included in various orders. For the sake of clarity, the example block diagram described below can control the flow of the pumping system based on a detection of a performance value, such as a change in flow pressure and/or filter loading as determined though either direct or indirect measurement and/or determination. Thus, in one example, the flow rate of water through the fluid circuit can be controlled upon a determination of a change in flow pressure. In a "sensorless" system, the flow pressure can be determined directly or indirectly from a measurement of various other values. In one example, the flow pressure can be determined from a measurement of motor speed and flow rate of the pumping system 10, 110. Thus, the controller 30, 130 can contain a one or more predetermined pump curves or associated tables using various variables (e.g., motor speed, flow rate, flow pressure, etc.). The curves or tables can be arranged or converted in various manners, such as into constant flow curves or associated tables. For example, the curves can be arranged as a plurality of pressure (psi) versus speed (RPM or Hz) curves for discrete flow rates (e.g., flow curves for the range of 15 GPM to 130 GPM in 1 GPM increments) and stored in the computer program memory. Thus, for a given flow rate, one can use a known value, such as the motor speed to determine (e.g., calculate or look-up) the flow pressure. The pump curves can have the data arranged to fit various mathematical models, such as linear or polynomial equations, that can be used to determine the performance value.

In another example, the flow pressure can be determined from a measurement of power consumption of the motor 24, 124 and/or associated other performance values (e.g., relative amount of change, comparison of changed values, time elapsed, number of consecutive changes, etc.). The change in power consumption can be determined in various ways, such as by a change in power consumption based upon a measurement of electrical current and electrical voltage provided to the motor 24, 124. Various other factors can also be included, such as the power factor, resistance, and/or friction of the motor 24, 124 components, and/or even physical properties of the swimming pool, such as the temperature of the water. It is to be appreciated that in the various implementations of a "sensorless" system, various other variables (e.g., filter loading, flow rate, flow pressure, motor speed, time, etc.) can be either supplied by a user, other system elements, and/or determined from the power consumption.

Keeping with the block diagram shown in FIG. 4, an example filter loading control process 300 is shown schematically. It is to be appreciated that the filter loading control process 300 can be an iterative and/or repeating process, such as a computer program or the like. As such, the process 300 can be contained within a constantly repeating loop, such as a "while" loop, "if-then" loop, or the like, as is well known in the art. In one example, the "while" or "if-then" loop can cycle at predetermined intervals, such as once every 5 minutes, though various other time cycle intervals are also contemplated. Further, it is to be appreciated that the loop can include various methods of breaking out of the loop due to various conditions and/or user inputs. In one example, the loop can be broken (and the program restarted) if a user changes an input value or a blockage or other alarm condition is detected in the fluid circuit.

Thus, the process 300 can be initiated with step 302 and proceeds to step 304. At step 304 information can be retrieved from a filter menu, such as through the user interface 31, 131. The information may take a variety of forms and may have a variety of contents. As one example, the information can include a value indicative of a clogged filter (CFP) that inhibits movement of water through the filter arrangement. The value indicative of a clogged filter (CFP) can also be referred to as a threshold value, and can include an absolute value, a relative change of a performance value (AP) with respect to a load value indicative of an unclogged filter (OP), and/or a percentage change of a performance value (AP) with respect to the load value indicative of an unclogged filter (OP). Thus, the value indicative of a clogged filter (CFP) can be entered by a user directly, such as in pounds per square inch (PSI), or can be entered indirectly as a value, such as a value between 1 and 128. For example, a clogged filter value input of 10 psi can indicate, relative to a baseline value, such as the load value indicative of an unclogged filter (OP), a clogged filter condition. Alternatively, the value indicative of a clogged filter (CFP) can be calculated or otherwise determined by the controller 30, 130, such as by a look-up table or a constant value retrieved from memory. As another example, the information can include the value indicative of an unclogged filter (OP) that permits movement of water through the filter arrangement. It should be appreciated that such information (e.g., values) is desired and/or intended, and/or preselected/predetermined.

Subsequent to step 304, the process 300 proceeds to step 306. At step 306, the process 300 can determine whether a predetermined flow reference has been reached by the pumping system 10, 110. As stated previously, the process 300 can act to maintain the predetermined water flow rate despite an increase in filter loading caused by the filter arrangement becoming clogged over time. Additionally, once a steady state flow condition has been reached (e.g., the pumping system 10, 110 maintains the reference flow rate), the controller 30, 130 can use the steady state flow rate and corresponding motor speed to determine the flow pressure, as described previously herein. Thus, the process can wait until the flow reference has been reached until beginning to monitor the filter loading. Accordingly, if the controller 30, 130 finds that the predetermined water flow rate has not yet been achieved by the pumping system 10, 110 (e.g., FALSE), the process 300 can proceed directly to step 308 to exit the filter loading process 300 until the next time cycle (e.g., the next five minute time cycle). Alternatively, if the predetermined water flow rate has actually been achieved (e.g., TRUE), the process 300 can proceed onto step 310.

At step 310, the process 300 can determine whether the present time cycle includes the first steady-state condition of the pumping system 10, 110 that immediately follows a cleaning cycle for the filter arrangement. In one example, a steady-state condition can include a stable (e.g., not transient) maintenance of the predetermined flow rate of step 306 by the pumping system 10, 110. Thus, step 310 can determine whether the present time cycle includes the first steady-state condition of the pumping system 10, 110 that immediately follows a backwash operation. If step 310 determines that the present time cycle does not include the first steady-state condition (e.g., FALSE), the process 300 can proceed onto step 314.

However, if step 310 determines that the present time cycle does actually include the first steady-state condition of the pumping system 10, 110 following a cleaning cycle (e.g., TRUE), the process 300 can proceed onto step 312. At step 312, the process 300 can determine (e.g., calculate, measure, etc.) a value indicative of an unclogged filter, which can also be referred to as an offset value. Thus, the offset value can correspond to a condition of substantially no filter loading (e.g., 0%), as shown in items 206 and 208 of FIG. 3. In one example, the offset value can include the water flow pressure through the clean filter arrangement and can be referred to as an offset pressure (OP). It is to be appreciated that, because a clean filter can often have some flow pressure associated with the water being moved and filtered therethrough, it can be beneficial to know this baseline offset pressure (OP) value. However, the offset value can also be otherwise determined by the controller 30, 130, such as by being retrieved from memory or even from a user input in step 304.

Subsequent to either of steps 310 or 312, the process can proceed onto step 314. At step 314, the process 300 can determine (e.g., calculate, measure, compare, etc.) a performance value of the pumping system 10, 110 during the filtration operation, such as flow pressure value of the water being moved through the filter arrangement. The flow pressure value can also be referred to as an actual pressure (AP) of the pumping system 10, 110. The actual pressure value (AP) can be determined in various manners, such as by a pressure sensor. Alternatively, as described previously, in a "sensorless" system the flow pressure can be determined directly or indirectly from a constant flow curve (e.g., motor speed vs. pressure), measurement of power consumption of the motor 24, 124, and/or even from associated other performance values (e.g., motor speed, flow rate, time, filter loading, relative amount of change, comparison of changed values, time elapsed, number of consecutive changes, etc.). The power consumption can be determined in various ways, such as by a measurement of electrical current and electrical voltage provided to the motor 24, 124. In addition or alternatively, the performance value can include various other values, such as motor speed, flow rate, or the like that can be used to indirectly determine the filter loading.

Subsequent to step 314, the process can proceed onto step 316 to determine a relative loading value of the filter arrangement. The relative loading value of the filter arrangement can be based upon the value indicative of an unclogged filter, the value indicative of a clogged filter, and the performance value. Thus, in one example, the relative filter loading value can be based upon the offset pressure (OP), the user input clogged filter value (CFP), and the actual pressure value (AP) of the filter arrangement. The relative filter loading value can be determined in various manners. In one example, the relative filter loading value can be calculated as a percentage directly from the offset pressure (OP), clogged filter value (CFP), and the actual pressure value (AP). For example, the relative filter loading value percentage can be determined through the formula $100*((AP-OP)/(CFP-OP))$. Thus, using this formula, if the offset pressure (OP) is equal to 10 psi, the clogged filter value (CFP) is 20 psi, and the actual pressure (AP) is equal to 15 psi, the relative filter loading is equal to 50%.

In another example, the relative filter loading value can be calculated from a chart or graph similar to that shown in FIG. 3, or even from another mathematical equation, chart, or graph. Other comparisons between any or all of the offset pressure (OP), clogged filter value (CFP) and/or actual pressure value (AP) can also be used, and can even include various other values (e.g., time, power, flow, motor speed, etc.). It is to be appreciated that the determination of any or all of the values (e.g., AP, OP, CFP, relative loading value) can be exact or estimated values, and that the process 300 can operate effectively with either or both.

Subsequent to the determination of the relative loading value for the filter arrangement, the process 300 can proceed onto step 318. At step 318, the process 300 can perform various actions in response to the relative loading value. In one example, step 318 can make a determination as to whether the relative filter loading value exceeds a predetermined or threshold value. In another example, the process 300 can determine a relative change of the actual pressure (AP) value with respect to a load value indicative of an unclogged filter (OP), and/or a percentage change of the actual pressure (AP) value with respect to the load value indicative of an unclogged filter (OP). In still yet another example, the process 300 can determine a relative and/or percentage change in the actual pressure (AP) value with respect to a previous measurement taken during a previous time cycle interval.

In the shown example, step 318 can determine whether the calculated relative filter loading percentage exceeds 100%. If the relative filter loading percentage does not exceed 100% (e.g., FALSE), the process can proceed onto step 320. At step 320, the process 300 can display the relative loading value for viewing by a user. The pumping system 10, 110 can include various types of displays that may or may not be incorporated into the user interface 31, 131. In one example, the pumping system 10, 110 can include a liquid crystal display (LCD) or the like that is configured to display the relative loading value in an alphanumeric manner (e.g., "Filter Loading is 58%") or the like. The LCD display can also be configured to display various other information, such as the clogged filter pressure (CFP), offset pressure (OP), and/or the actual pressure (AP). In another example, the pumping system 10, 110 can include one or more visual indicators, such as one or more LED lights and/or adjacent indicia corresponding to various relative loading values.

Subsequent to step 320, the process 300 can proceed onto step 322. At step 322, the process 300 can determine whether the present water flow rate through the pumping system is equal to the original reference flow rate. If the present water flow rate does not equal the reference flow rate (e.g., FALSE), the process 300 can proceed onto step 324 to control the motor in response to the relative loading value, such as may be required if the filter is partially loaded. For example, as shown in step 324, the process 300 can increase the flow rate by one gallon per minute (GPM), though the process 300 can make other corrections as needed.

If the present water flow rate does equal the reference flow rate (e.g., TRUE), or if the process has already performed step 324, the process 300 can then proceed onto step 308 to exit the filter loading process 300. Because the filter loading process 300 is a repetitious program, it can repeat at a predetermined interval, such as once every five minutes, though various other time intervals are contemplated to be within the scope of the invention. It can be beneficial for the time cycle intervals to have an appreciable length as it can often take a few months for a general pool filter to reach a clogged condition. However, in situations where a filter is prone to clog easily or quickly, the time cycle interval can be reduced accordingly.

Turning back to step 318, if the relative filter loading percentage does exceed 100% (e.g., TRUE), then the process can proceed onto step 326. At step 326, the process 300 can indicate a 100% or greater filter loading condition, and can also display various alarms. In one example, the LCD display could display a warning message, such as "Service System Soon." In addition or alternatively, various other indicators and/or warnings can also be used to alert a user, such as various other lights and/or sounds (e.g., beepers, buzzers or the like).

Subsequent to step 326, the process 300 can proceed onto step 328 to control the motor in response to the relative loading value, such as may be required if the filter is in a clogged condition. For example, as shown in step 328, the process 300 can decrease the flow rate by one gallon per minute (GPM), though the process 300 can make other corrections as needed. By decreasing the flow rate by one GPM, the actual pressure (AP) of the water flow through the filter arrangement can also decrease. The process 300 can continue to decrease the flow rate during each consecutive time cycle until the relative loading value is less than 100% to help prolong the filter life. In addition or alternatively, the process 300 can continue to decrease the flow rate during each consecutive time cycle until a backwash cycle has been completed to clean the filter arrangement. In addition or alternatively, the process 300 can make other adjustments. For example, the process 300 can automatically initiate a backwash cycle to clean the filter arrangement, or it can even shut down the pumping system 10, 110 until a user manually restarts it. Subsequent to step 328, the process 300 can then proceed onto step 308 to exit the filter loading process 300, whereupon the process 300 can repeat at the predetermined interval as discussed above.

Further still, in accordance with yet another aspect of the invention, a method of moving water of a swimming pool in connection with performance of a filtering operation upon the water is provided. The method can include some or all of the aforementioned features of the filter loading control process 300, though more or less steps can also be included to accommodate the various other features described herein. One example method of moving water of a swimming pool can be used with a water pump for moving water in connection with performance of a filtering operation upon the water, a variable speed motor operatively connected to drive the pump, and a filter arrangement in fluid communication with the pump. The method can comprise the steps of determining a flow pressure value indicative of an unclogged filter that permits movement of water through the filter arrangement, determining a threshold flow pressure value indicative of a clogged filter that inhibits movement of water through the filter arrangement, and determining an actual pressure value of the pumping system during the filtering operation. The method can also include the steps of determining a relative loading value of the filter arrangement based upon the pressure value indicative of an unclogged filter, pressure value indicative of a clogged filter, and the actual pressure value, displaying the relative loading value, and controlling the motor in response to the relative loading value.

It is to be appreciated that the controller (e.g., 30 or 130) may have various forms to accomplish the desired functions. In one example, the controller 30 includes a computer processor that operates a program. In the alternative, the program may be considered to be an algorithm. The program may be in the form of macros. Further, the program may be changeable, and the controller 30 is thus programmable.

Figure 5:
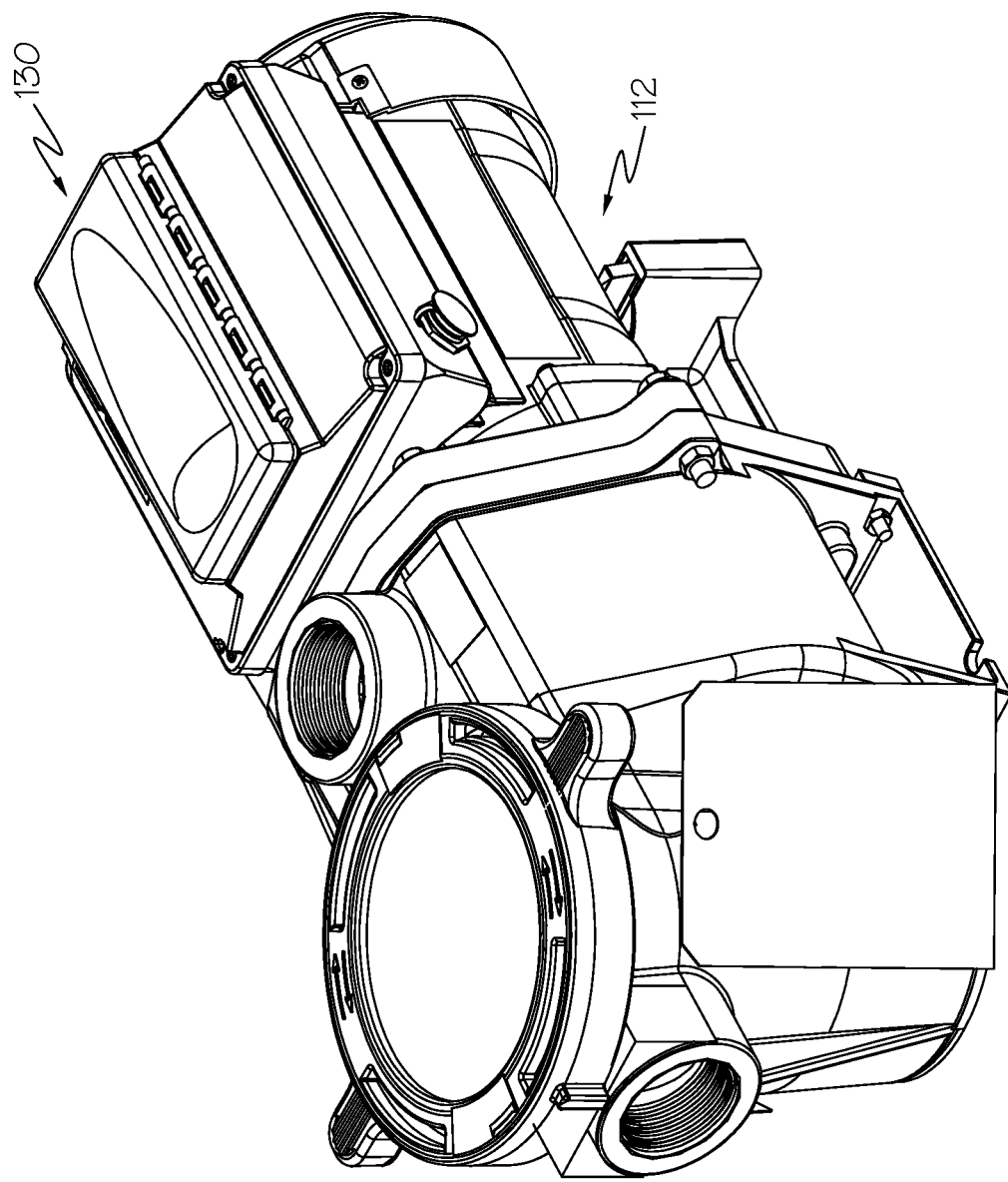
FIG. 5 is a perceptive view of an example pump unit that incorporates one aspect of the present invention.
Figure 6:
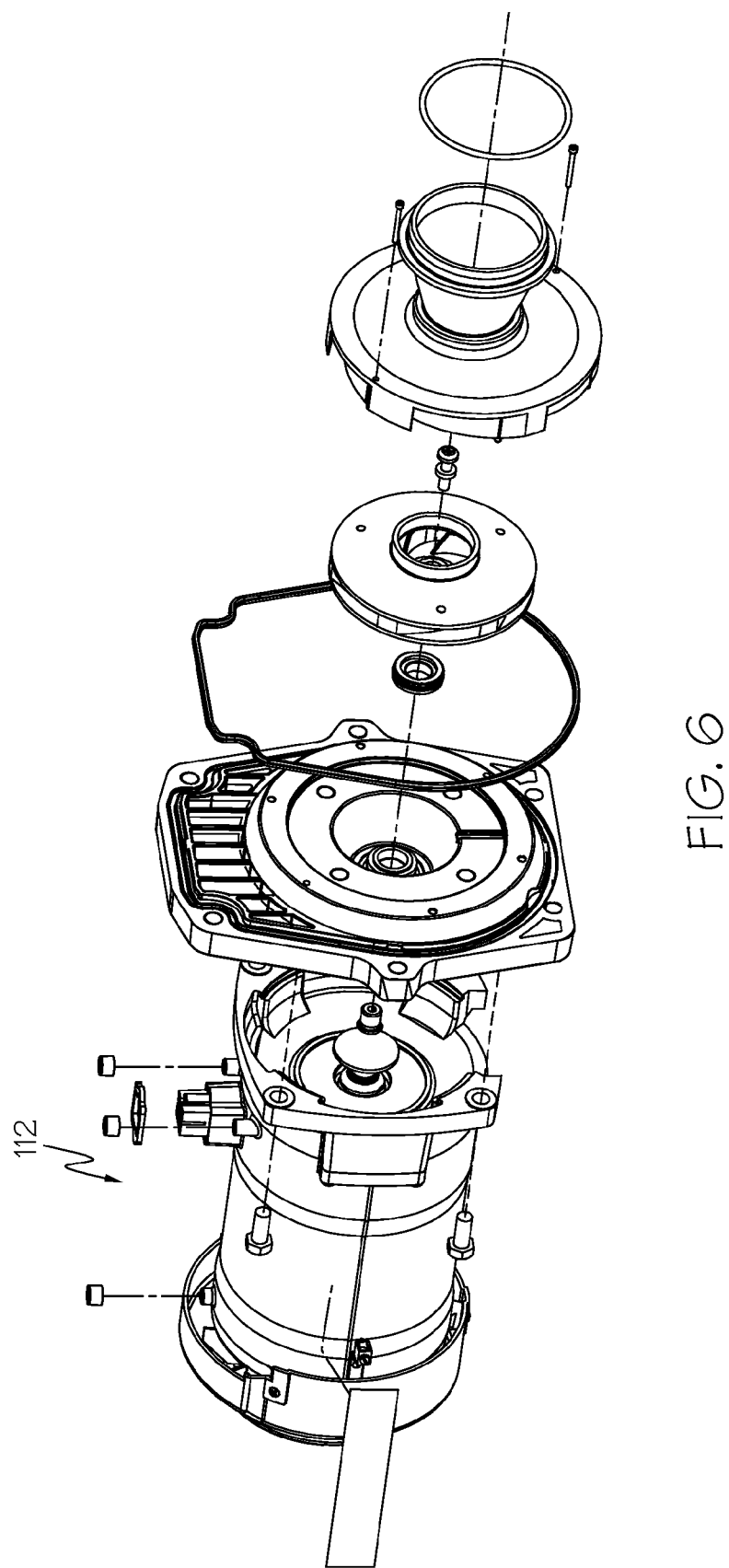
FIG. 6 is a perspective, partially exploded view of a pump of the unit shown in FIG. 5.
Figure 7:
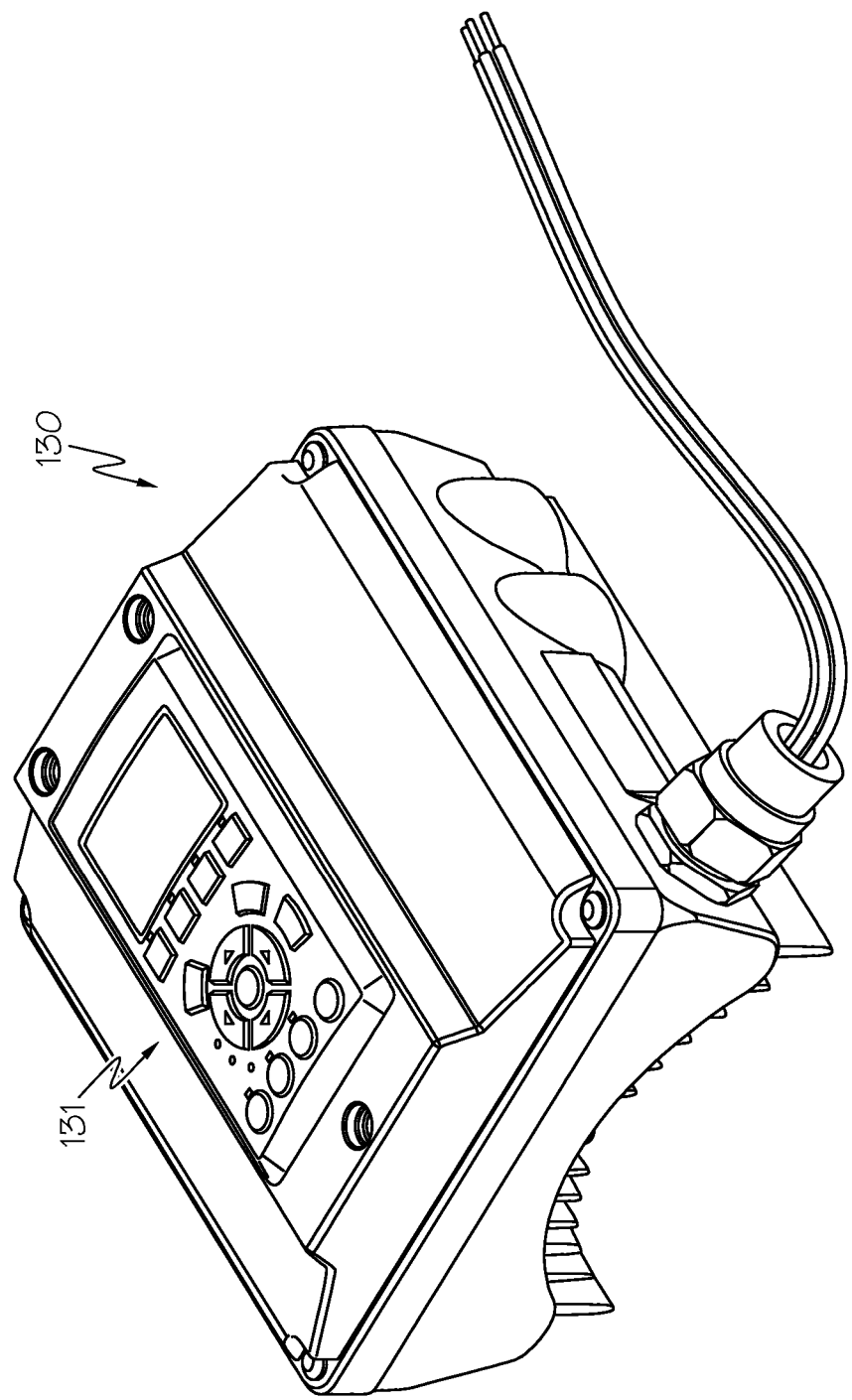
FIG. 7 is a perspective view of a controller unit of the pump unit shown in FIG. 5.

Also, it is to be appreciated that the physical appearance of the components of the system (e.g., 10 or 110) may vary. As some examples of the components, attention is directed to FIGS. 5-7. FIG. 5 is a perspective view of the pump unit 112 and the controller 130 for the system 110 shown in FIG. 2. FIG. 6 is an exploded perspective view of some of the components of the pump unit 112. FIG. 7 is a perspective view of the controller 130.

It should be evident that this disclosure is by way of example and that various changes may be made by adding, modifying or eliminating details without departing from the scope of the teaching contained in this disclosure. As such it is to be appreciated that the person of ordinary skill in the art will perceive changes, modifications, and improvements to the example disclosed herein. Such changes, modifications, and improvements are intended to be within the scope of the present invention.

The invention claimed is:

1. A pumping system for a swimming pool, the pumping system comprising:
 a pump;
 a motor coupled to the pump;
 a filter coupled to the pump; and
 a controller in communication with the motor,
  the controller determining if a steady state flow rate to achieve a desired number of turnovers in the swimming pool has been reached,
  the controller calculating a filter loading value based on a clogged filter pressure
 value, an unclogged filter pressure value, and an actual pressure of the pumping system after the steady state flow rate has been reached,
  the controller decreasing an actual flow rate of the pumping system if the filter loading value is greater than a threshold value to help prolong filter life after the filter has become clogged,
  the controller decreasing the actual flow rate during at least one subsequent time cycle until at least one of the filter loading value is less than the threshold value and a backwash cycle is completed,
  the controller increasing the actual flow rate if the filter loading value is less than the threshold value and the actual flow rate is less than the steady state flow rate.

2. The pumping system of claim 1, wherein the controller attempts to maintain the steady state flow rate despite an increase in the filter loading value caused by the filter becoming clogged.

3. The pumping system of claim 1, wherein the clogged filter pressure value includes at least one of an absolute value, a relative change with respect to the unclogged filter pressure value, and a percentage change with respect to the unclogged filter pressure value.

4. The pumping system of claim 1, wherein the controller determines whether the steady state flow rate substantially immediately follows a backwash operation.

5. The pumping system of claim 4, wherein the controller determines the unclogged filter pressure value after the backwash operation.

6. The pumping system of claim 1, wherein the controller uses a motor speed to determine the actual pressure.

7. The pumping system of claim 6, wherein the controller uses a curve of motor speed versus pressure to determine the actual pressure.

8. The pumping system of claim 1, wherein the controller uses power consumption of the motor to determine the actual pressure.

9. The pumping system of claim 8, wherein the controller determines the power consumption of the motor from at least one of current and voltage provided to the motor.

10. The pumping system of claim 1, wherein the filter loading value is a percentage calculated from the clogged filter pressure value, the unclogged filter pressure value, and the actual pressure, and wherein the threshold value is about 100 percent.

11. The pumping system of claim 1, wherein the controller determines whether the filter loading value has exceeded the threshold value by determining at least one of a relative change and a percentage change in the actual pressure with respect to a load angle of an unclogged filter.

12. The pumping system of claim 11, wherein the controller determines at least one of the relative change and the percentage change with respect to a previous measurement taken during a previous time cycle interval.

13. The pumping system of claim 1, wherein the controller displays the filter loading value.

14. The pumping system of claim 13, wherein the controller displays a service system soon indicator when the filter loading value is greater than the threshold value.

15. The pumping system of claim 1, wherein the controller increases the actual flow rate by about one gallon per minute in order to attempt to maintain the steady state flow rate.

16. The pumping system of claim 1, wherein the controller decreases the actual flow rate by about one gallon per minute in order to lower the filter loading value.

17. The pumping system of claim 16, wherein the controller decreases the actual flow rate during each consecutive time cycle of a predetermined elapsed period of time until at least one of the filter loading value is less than the threshold value and a backwash cycle is completed.

18. The pumping system of claim 1, wherein the controller determines the filter loading value about once every five minutes.

19. The pumping system of claim 1, wherein the controller automatically initiates a backwash cycle when the filter loading value is greater than the threshold value.

20. The pumping system of claim 1, wherein the controller automatically shuts down the pumping system when the filter loading value is greater than the threshold value and the pumping system remains shut down until the pumping system is manually restarted.

21. The pumping system of claim 1, wherein the filter includes at least one of a sand filter, a cartridge filter, and a diatomaceous earth filter.

22. The pumping system of claim 1, wherein the actual flow rate of the pumping system depends in part on the desired number of turnovers.

* * * * *